Jan. 3, 1933.  M. TRECHSEL  1,893,006
INTERNAL COMBUSTION ENGINE WITH SUPERCHARGING
Filed May 22, 1928   2 Sheets-Sheet 1

INVENTOR:
Max Trechsel
BY
Pennie, Davis, Marvin & Edmonds
ATTORNEYS

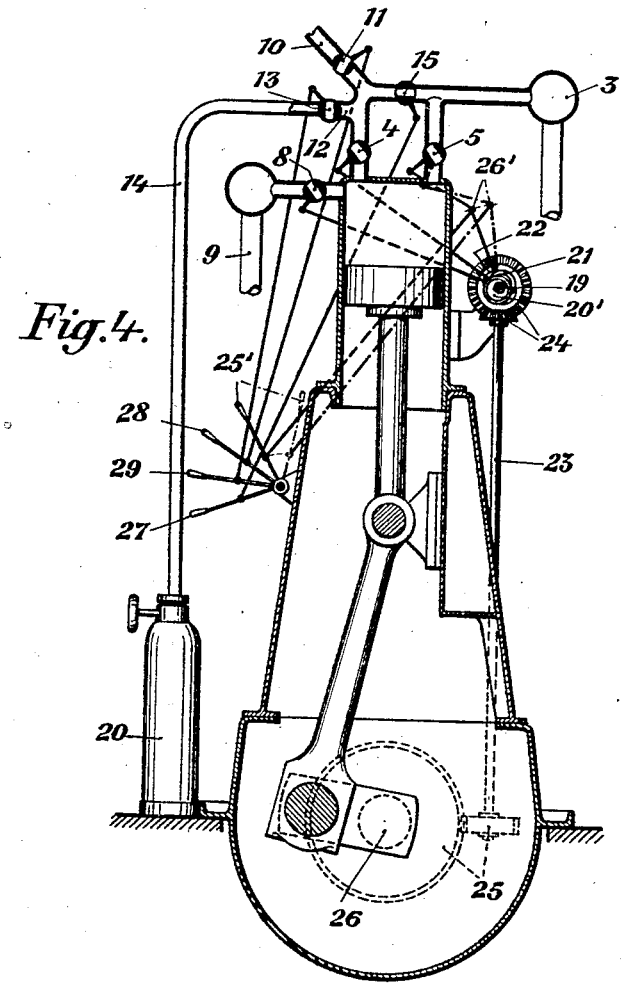

Patented Jan. 3, 1933

1,893,006

UNITED STATES PATENT OFFICE

MAX TRECHSEL, OF WINTERTHUR, SWITZERLAND, ASSIGNOR TO THE FIRM SULZER FRÈRES SOCIÉTÉ ANONYME, OF WINTERTHUR, SWITZERLAND

INTERNAL COMBUSTION ENGINE WITH SUPERCHARGING

Application filed May 22, 1928, Serial No. 279,694, and in Switzerland August 1, 1927.

This invention relates to four-stroke internal combustion engines with supercharging and has for its object to provide an engine more efficient than those at present in use.

In four-stroke internal combustion prime movers operated with compressed air the inlet and exhaust ports have heretofore been constructed of approximately equal cross-sectional area notwithstanding the difference in density between the compressed air entering the cylinder and the spent gases issuing therefrom. This condition results in an appreciable throttling of the air at the inlet port and needless heat conduction losses by the exhaust gases (which are about one-half the density of the entering charge) at the outlet port.

According to this invention the air which is compressed by a supercharging compressor before being supplied to the engine cylinder is admitted through two or more inlet valves arranged in parallel and preferably the cross-sectional area of the openings controlled by these valves is approximately doubled.

At least one of the inlet valves may, if desired, be placed in communication with the atmospheric air and in some cases one or more of the inlet valves may be in communication with the reservoir containing compressed air employed during the starting period, while, yet again, one or more of the inlet valves may be connected to and capable of being placed in communication with a chamber for measuring the volume of scavenging and supercharging air employed.

Three constructions according to this invention are diagrammatically illustrated in sectional elevation in the accompanying drawings.

In the drawings:

Fig. 4 is a vertical section, partly in elevation, showing how the various valves are operated.

Figure 1:
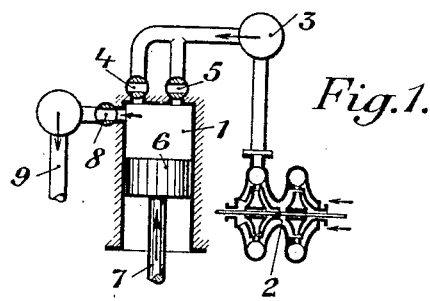
Fig. 1 shows an arrangement in accordance with the invention.

In the arrangement shown in Figure 1, the cylinder 1 of a four-stroke internal combustion engine is supplied with supercharging air which is compressed before admission into the engine cylinder by a two-stage compressor 2 which may be driven by means of a waste gas turbine or in any other way. The air from this compressor first passes into a reservoir 3 whence it is admitted into the engine cylinder through inlet valves 4 and 5 of any known construction (shown closed), the engine piston 6 in the position illustrated in Figure 1 moving upwards in the direction of the arrow 7 so as to expel the exhaust gases through the valve 8 shown in its open position controlling the exhaust port and passage 9 leading therefrom. The ports controlled by the valves 4, 5 and 8 are each of the same cross-sectional area and it will therefore be seen that the cross-sectional area of the passages through which the charging air is admitted is twice that of the passage through which the combined exhaust gases escape.

Figure 2:
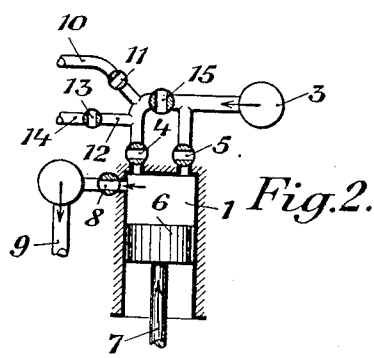
Fig. 2 shows a modification wherein the inlet ports are connected to supply conduits at different pressures.

The arrangement illustrated in Figure 2 differs from that above described in that the inlet valve 4 may be connected to the atmosphere through a pipe 10 normally closed by means of a valve 11. Further the inlet port controlled by the valve 4 can, if desired, be placed in communication with a pipe 14 containing compressed air supplied from cylinder 20 for starting purposes, by means of a branch pipe 12 when a valve 13 is open. A stop valve 15 is arranged between the compressor and the port controlled by the inlet valve 4. With a high load compressed air is delivered by compressor 2 through the two admission elements 4 and 5 from a container 20, with a medium-high load through one element, such as for example 5, into the cylinder, whereas with a small load the combustion air is directly taken in from the outside atmosphere through the duct 10. Fig. 2 shows the position of the valves during the exhaust period.

Figure 3:
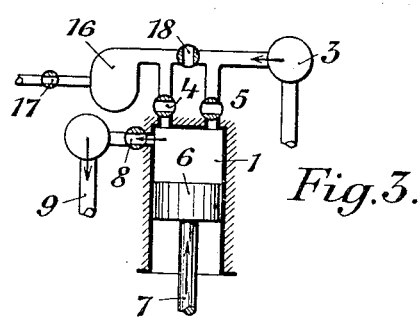
Fig. 3 shows still another modification employing a measuring chamber.

A further alternative arrangement is illustrated in Figure 3 in which a measuring chamber 16 is arranged between the port controlled by the inlet valve 4 and the supply of supercharging or scavenging air. Chamber 16 functions as a measuring device for the scavenging air or even for the charging air and prevents any unnecessary blowing-through of air resulting in an excessively high consumption thereof and supplies the cylinder with precisely that amount of air required for scavenging or charging purposes. For small loads admission of the air directly from the atmosphere is sufficient, while for increasing loads the valves 4 and 5 are adapted to be manipulated as described above. The chamber 16 can be shut off from the atmosphere by means of a valve or cock 17, and from the compressor by a similar valve 18.

An example showing how the flow-intercepting elements 4, 5, 8, 11, 13, and 15 are actuated, is given in Fig. 4. The crank shaft 26 rotates a shaft 19 by means of a train of reduction gears 25, a shaft 23, and conical gears 24. Mounted on shaft 19 are cams 20', 21, and 22 which open and close the flow-intercepting elements 4, 5, and 8 in synchronism with the engine cycles by means of the links shown. For the purpose of cutting out a valve, such as 5, a lever 25' is employed, of which the link-pivot 26' can be shifted to the position indicated by the dot-and-dash lines, by lever 25', so as to disconnect the flow-intercepting element 5 from the action of cam 21. This can be effected according to the load on the engine, as for instance, when the engine is running at the smaller loads without initial charging. The flow-intercepting element 15 (or 18, in Fig. 3) is actuated by lever 27. The shifting of the flow-intercepting element 11 is effected by means of lever 28, and for the actuation of the flow-intercepting element 13 (for the starting air) a hand-operated lever 29 is provided. For the flow-intercepting elements themselves any known valve-design can be used. The flow-intercepting devices 11, 13, 15, and 18 can, instead of being actuated by means of a hand-operated lever, also be controlled by mechanical means, as, for instance, by providing on the shaft 19, suitable cams, eccentrics, or the like appurtenances.

If desired means may be provided for supplying supercharging air at different pressures through the inlet ports controlled by the valves 4 and 5 and these valves may be operated separately or in an interdependent manner, in some cases the valves being so controlled that towards the end of the exhaust period at least one of the inlet ports will be opened so as to secure a thorough scavenging of the combustion chamber.

An engine constructd according to this invention reduces to a minimum not only the loss of velocity of the inlet air but also the leakage and heat losses from the exhaust while ensuring better charging of the engine cylinder. The balancing of the pipe losses has moreover the special advantage that whereas any increase in the exhaust resistance only slightly affects the efficiency of the waste gas turbine, should such be employed, the reduction of the charging resistances greatly improves the output of the supercharging compressor.

I claim:—

1. In a four-stroke internal combustion engine, an engine cylinder working-chamber having an exhaust port therein, a plurality of inlet ports in communication with a common source of compressed air, said inlet ports having a cross-sectional area substantially double that of the exhaust port.

2. In a four-stroke internal combustion engine, an engine cylinder working-chamber having a plurality of inlet ports therein, said inlet ports being so constructed and arranged as to be either contemporaneously or non-contemporaneously placed in communication with the cylinder, depending upon the load.

3. In a four-stroke internal combustion engine, an engine cylinder working-chamber having a plurality of inlet ports therein, said inlet ports being normally in communication with a common source of compressed air and one of said inlet ports being arranged to be placed in communication with the atmosphere.

4. In a four-stroke internal combustion engine, an engine cylinder working-chamber having an exhaust port and a plurality of inlet ports therein, said inlet ports being normally in communication with a common source of compressed air, one of said inlet ports being arranged to be placed in communication with an alternate source of compressed air, and means for interrupting communication with the common source of compressed air.

5. In a four-stroke internal combustion engine, an engine cylinder working-chamber having an exhaust port and a plurality of inlet ports therein, said inlet ports being normally in communication with a common source of compressed air, a pipe communicating with one of said inlets and opening to the atmosphere, a pipe leading from a reservoir containing air under pressure and in communication with one of said cylinders, and valves for selectively connecting the cylinder with either the atmosphere, the reservoir or the compressed air source.

In testimony whereof I have affixed my signature.

MAX TRECHSEL.